(12) United States Patent
Zhang et al.

(10) Patent No.: US 11,945,337 B2
(45) Date of Patent: Apr. 2, 2024

(54) SYSTEM AND METHOD FOR VEHICLE BATTERY MANAGEMENT, STORAGE MEDIUM, AND SERVER SYSTEM

(71) Applicant: NIO TECHNOLOGY (ANHUI) CO., LTD, Hefei (CN)

(72) Inventors: Xudong Zhang, Anhui (CN); Peng Zhang, Anhui (CN); Huaidong Tang, Anhui (CN)

(73) Assignee: NIO TECHNOLOGY (ANHUI) CO., LTD, Hefei (CN)

(*) Notice: Subject to any disclaimer, the term of this patent is extended or adjusted under 35 U.S.C. 154(b) by 102 days.

(21) Appl. No.: 17/505,133

(22) Filed: Oct. 19, 2021

(65) Prior Publication Data

US 2022/0126728 A1  Apr. 28, 2022

(30) Foreign Application Priority Data

Oct. 23, 2020 (CN) .......................... 202011145145.2

(51) Int. Cl.
*B60L 58/22* (2019.01)
*B60L 58/12* (2019.01)
(Continued)

(52) U.S. Cl.
CPC .............. *B60L 58/22* (2019.02); *B60L 58/12* (2019.02); *H01M 10/425* (2013.01);
(Continued)

(58) Field of Classification Search
CPC .... B60L 58/22; B60L 58/12; B60L 2240/547; B60L 2240/545; B60L 2240/549;
(Continued)

(56) References Cited

U.S. PATENT DOCUMENTS 6,922,904 B2 * 8/2005 Groell .................. G01B 21/047
33/561
10,170,908 B1 * 1/2019 Catalano ............... H02J 7/0068
(Continued)

FOREIGN PATENT DOCUMENTS

CN     102118123 A  *  7/2011  .............. G05B 15/02
CN     108544925 A  *  9/2018  .............. B60L 58/10
(Continued)

OTHER PUBLICATIONS

English translation of CN 110196850A, Tang et al., (Tang) (Year: 2019).*

(Continued)

*Primary Examiner* — M Baye Diao
(74) *Attorney, Agent, or Firm* — Sheridan Ross P.C.

(57) ABSTRACT

The present application relates to a system and method for vehicle battery management, a storage medium, and a server system. The system for vehicle battery management includes: a communications subsystem configured to receive battery signal data in a distributed message queue; a metadata management subsystem configured to store battery information; and a distributed processing subsystem configured to parse the battery signal data based on the battery information, to obtain parsed data and alarm data. In this way, centralized battery management can be implemented, thereby overcoming disadvantages in terms of alarms/warnings generated by the batteries themselves.

16 Claims, 4 Drawing Sheets

(51) Int. Cl.
   *H01M 10/42* (2006.01)
   *H02J 7/00* (2006.01)
(52) U.S. Cl.
   CPC ....... *H02J 7/0014* (2013.01); *B60L 2240/547* (2013.01); *H01M 2010/4271* (2013.01)
(58) Field of Classification Search
   CPC ........ B60L 58/10; B60L 58/24; B60L 3/0046; H01M 10/425; H01M 2010/4271; H02J 7/0014; Y02E 60/10; H04L 67/12; H04L 67/34; H04L 67/55; H04L 69/40; Y02T 10/70; Y02T 90/16
   USPC .......................................................... 320/109
   See application file for complete search history.

(56) References Cited

U.S. PATENT DOCUMENTS

| | | | | |
|---|---|---|---|---|
| 10,315,520 | B2* | 6/2019 | Shu | G05B 19/042 |
| 10,644,961 | B2* | 5/2020 | Nolan | H04L 41/12 |
| 11,232,655 | B2* | 1/2022 | Bhattacharyya | H04L 67/12 |
| 2012/0013290 | A1* | 1/2012 | Pariseau | B60L 58/22 |
| | | | | 320/106 |
| 2015/0239365 | A1 | 8/2015 | Hyde et al. | |
| 2018/0134171 | A1* | 5/2018 | Hyde | B60L 3/12 |
| 2018/0281598 | A1 | 10/2018 | Shu | |
| 2020/0055421 | A1* | 2/2020 | Sastinsky | G06F 9/451 |
| 2020/0395627 | A1* | 12/2020 | Kilburn | H02J 7/00714 |
| 2021/0248844 | A1* | 8/2021 | Gunderson | G07C 5/006 |
| 2022/0113356 | A1* | 4/2022 | Kasselman | H01M 10/4257 |

FOREIGN PATENT DOCUMENTS

| | | | | |
|---|---|---|---|---|
| CN | 110196850 A | * | 4/2019 | ........... G06F 16/248 |
| CN | 110196850 | | 9/2019 | |
| KR | 20110056863 A | * | 5/2011 | .............. H02J 13/00 |
| KR | 20210048319 A | * | 5/2021 | ............ B60L 53/305 |

OTHER PUBLICATIONS

Extended Search Report for European Patent Application No. 21204115.6, dated Mar. 21, 2022, 8 pages.

* cited by examiner

SYSTEM AND METHOD FOR VEHICLE BATTERY MANAGEMENT, STORAGE MEDIUM, AND SERVER SYSTEM

CROSS-REFERENCE TO RELATED APPLICATION

This application claims the benefit of China Patent Application No. 202011145145.2 filed Oct. 23, 2020, the entire contents of which are incorporated herein by reference in its entirety.

TECHNICAL FIELD

The present application relates to management of a vehicle battery, and specifically, to a system for vehicle battery management, a method for vehicle battery management, a storage medium, and a server system.

BACKGROUND ART

A battery is an important part of an electric vehicle, and for timely safety and performance monitoring of the battery, the vehicle regularly reports a signal status of the battery to cloud and gives an alarm during traveling. A charging device, when charging the battery, also periodically reports the signal status of the battery to the cloud. Data reported has the following characteristics: First, an amount of the data is large, and a period of data reporting is in seconds. Second, the data has many data sources, where the battery may be in the vehicle, may be in the charging device, or may even be in a battery storage center. In all these scenarios, battery data may be reported. Third, the data has complex formats, has nearly a thousand fields, and is usually stored in a binary format, and original data needs to be parsed using specialized tools. In addition, the data reported may alternatively be from thousands of batteries.

A battery hardware device also gives an alarm when working. However, usually, due to a long period of software function development, testing, and deployment on the battery device, alarm giving lacks flexibility, and cannot adapt well to changes outside the vehicle. For some relatively severe problems, it would probably be too late when an alarm is given by the battery itself, and an alarm supervisor has no enough time to locate and handle specific problems and cannot notify a driver and passengers in time.

SUMMARY OF THE INVENTION

Embodiments of the present application provide a system for vehicle battery management, a method for vehicle battery management, a storage medium, and a server system, to perform centralized management of a vehicle battery.

According to an aspect of the present application, a system for vehicle battery management is provided, including: a communications subsystem configured to receive battery signal data in a distributed message queue; a metadata management subsystem configured to store battery information; and a distributed processing subsystem configured to parse the battery signal data based on the battery information, to obtain parsed data and alarm data.

In some embodiments of the present application, optionally, the system further includes a storage subsystem, and the storage subsystem is configured to store the parsed data and the alarm data in a distributed manner.

In some embodiments of the present application, optionally, the battery signal data includes at least one of the following: a data collection moment, a voltage of a battery pack, a maximum cell voltage, a minimum cell voltage, an average cell voltage, an average current, a battery insulation resistance, a state of charge, a status of a vehicle to which a battery belongs, battery remaining energy, a maximum cell temperature, a minimum cell temperature, an average cell temperature, a battery type, and a battery serial number.

In some embodiments of the present application, optionally, the battery information includes at least one of the following: information about a battery serial number, serial number information of a vehicle to which a battery belongs, a position of the vehicle to which the battery belongs, serial number information of a battery charging device, a name of battery signal data, a format of the battery signal data, and a source of the battery signal data.

In some embodiments of the present application, optionally, the distributed message queue includes subqueues, and the communications subsystem receives battery signal data from a same battery in a same subqueue.

In some embodiments of the present application, optionally, the distributed processing subsystem includes subnodes, and the battery signal data received in a same subqueue is preferentially parsed by a same subnode.

In some embodiments of the present application, optionally, if the subnode is faulty, the distributed processing subsystem notifies another available subnode and sends data already parsed before the fault to the another available subnode.

In some embodiments of the present application, optionally, the distributed processing subsystem includes a parsing module, a buffer module, and an alarm module, where the parsing module is configured to parse the battery signal data to obtain the parsed data; the buffer module is configured to buffer a predetermined amount of latest parsed data; and the alarm module is configured to obtain the alarm data based on the predetermined amount of parsed data.

In some embodiments of the present application, optionally, the metadata management subsystem further stores an alarm algorithm, and the alarm module is configured to obtain alarm data by parsing latest parsed data of one battery based on the alarm algorithm.

In some embodiments of the present application, optionally, if the number of outliers in the parsed data within a time period exceeds a predetermined value, an alarm signal is generated.

In some embodiments of the present application, optionally, the system further includes an output subsystem, and the output subsystem is configured to output the alarm data in a distributed message queue.

In some embodiments of the present application, optionally, the system further includes: a data warehouse configured to receive and store the battery signal data from the communications subsystem; a distributed data processing and scheduling module configured to read the battery signal data in the data warehouse and generate warning data and statistical data based on the battery information; an online storage subsystem configured to store the warning data and the statistical data; and an interface module configured to invoke data in the online storage subsystem.

According to another aspect of the present application, a method for vehicle battery management is provided, including: receiving battery signal data in a distributed message queue; and parsing the battery signal data based on the battery information, to obtain parsed data and alarm data.

In some embodiments of the present application, optionally, the method further includes: storing the battery signal data; generating warning data and statistical data based on the battery information and the stored battery signal data; and storing the warning data and the statistical data for invocation.

According to another aspect of the present application, a non-transitory computer-readable storage medium is provided, where the non-transitory computer-readable storage medium stores instructions, where when the instructions are executed by a processor, the processor is enabled to perform any of the methods for vehicle battery management described above.

According to another aspect of the present application, a server system is provided, including any of the computer-readable storage media described above.

BRIEF DESCRIPTION OF THE DRAWINGS

The foregoing and other objectives and advantages of the present application will be more thorough and clearer from the following detailed descriptions in conjunction with the accompanying drawings, where the same or similar elements are represented by the same reference numerals.

DETAILED DESCRIPTION OF EMBODIMENTS

For the sake of brevity and illustrative purposes, this specification mainly describes the principles of the present application with reference to its exemplary embodiments. However, those skilled in the art would easily realize that a same principle may be equivalently applied to all types of systems for vehicle battery management and methods for vehicle battery management, storage media, and server systems, and the same or similar principles may be implemented in them, where any such changes do not depart from the true spirit and scope of the present application.

According to conventions in the industry, a battery hardware device gives an alarm when working, and the alarm is reported to the cloud in real time through the Internet of vehicles. After receiving the alarms, the cloud directly parses the alarms and stores the alarms in a cloud storage system, and filters an alarm about a severe problem and notifies the statistics about the alarm to a supervisor. However, this has at least the following several problems: After a battery itself gives an alarm, an alarm supervisor has no enough time to react. Limited by a software storage space inside a vehicle, a condition based on which the vehicle gives an alarm may be signal data having short duration (for example, data in last few minutes), and battery signal data about slow changes (in several hours or days) may not be easily tracked, stored, or given an alarm. There is a long period of alarm development, testing, configuration, and deployment on the battery device, probably as long as several weeks or months, so that there is poor timeliness and flexibility, which makes it unable to adapt well to changes around a battery of the vehicle.

Figure 1:
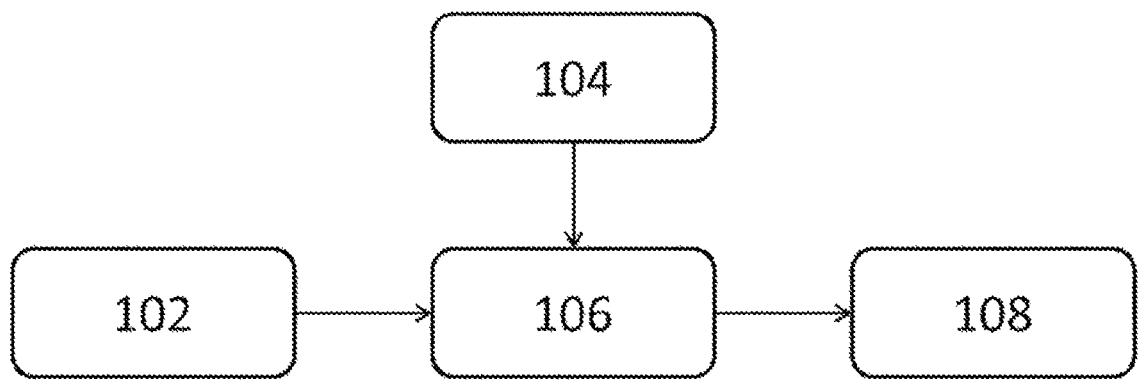
FIG. 1 shows a system for vehicle battery management according to an embodiment of the present application.

According to an aspect of the present application, a system for vehicle battery management is provided. As shown in FIG. 1, a system 10 for vehicle battery management includes a communications subsystem 102, a metadata management subsystem 104, and a distributed processing subsystem 106. The communications subsystem 102 is configured to receive battery signal data in a distributed message queue. Compared with a conventional manner of data sending and receiving, in the distributed message queue, a large amount of data can be received or sent in real time. Original battery signal data (or referred to as upstream data) from a vehicle/charging facility enters the distributed message processing queue via an external system, and therefore, the system 10 for vehicle battery management collects the upstream data. In some examples, Apache Kafka may be used as a distributed message queue.

Compared with a conventional solution, the system 10 for vehicle battery management can aggregate data from various data sources, to facilitate analysts in tracking a status of a single battery in a whole life cycle (of vehicle running, vehicle stopping, vehicle-mounted battery charging, swapping the battery out of the vehicle, recycling the battery to a storage station, etc.).

In some embodiments of the present application, the battery signal data not only represents data of a battery itself, but may also be data of a vehicle, a charging device, etc. associated with the battery. The battery signal data may include a data collection moment, a voltage of a battery pack, a maximum cell voltage, a minimum cell voltage, an average cell voltage, an average current, a battery insulation resistance, a state of charge, a status of a vehicle (including a traveling state and a charging state) to which a battery belongs, battery remaining energy, a maximum cell temperature, a minimum cell temperature, an average cell temperature, a battery type, and a battery serial number.

In some embodiments of the present application, the distributed message queue includes a plurality of subqueues, and the communications subsystem 102 receives battery signal data from a same battery in a same subqueue. In this way, it can be ensured that in normal cases, a same node processes data from a same battery, thereby avoiding extra and meaningless resource overheads inside the system 10 for vehicle battery management.

The metadata management subsystem 104 is configured to store battery information. The metadata management subsystem 104 stores basic information about various types of batteries (also referred to as metadata of the batteries). In view of differences between the batteries, processes of parsing for the batteries are not exactly the same, so that parsing needs to be performed based on the basic information about the batteries. The battery information stored in the metadata management subsystem 104 is read by the distributed processing subsystem 106 described in detail below, to achieve the objective of data parsing.

In some embodiments of the present application, the battery information (battery metadata) not only represents metadata (basic parameters) of a battery itself, but may also be metadata (basic parameters) of a vehicle, a charging device, etc. associated with the battery. The battery information may include information about a battery serial number, serial number information of a vehicle to which a battery belongs, a position of the vehicle to which the battery belongs, serial number information of a battery charging device, a name of battery signal data, a format of the battery signal data, and a source of the battery signal data. In the present application, unless special cases other than the following definitions are listed, the battery information is generally determined after factory delivery, and the battery signal data is generally generated and changes based on actual usage.

The distributed processing subsystem 106 is configured to parse the battery signal data based on the battery information, to obtain parsed data and alarm data. The parsed data may be used for retrieval and analysis. The alarm data may not only be used for retrieval and analysis, but may also be used to be sent to a related downstream person/device, etc.

The distributed processing subsystem 106 may aggregate data of a same battery within a short period of time and invoke a plurality of types of cloud alarm algorithms, to generate required alarm information. Therefore, the distributed processing subsystem 106 in the invention may be considered working in real time or quasi real time. For example, working based on latest received battery signal data and based on a single-point cloud alarm algorithm may be supported, and working based on battery signal data received within the most recent period of time and based on a window cloud storage alarm algorithm may further be supported. In addition, the cloud alarm algorithm may be dynamically configured. In some embodiments of the present application, the metadata management subsystem 104 further stores an alarm algorithm, and the distributed processing subsystem 106 is configured to parse the battery signal data based on the alarm algorithm, to obtain the parsed data and the alarm data. The distributed processing subsystem 106 may periodically (for example, every 1 minute) pull a latest cloud alarm algorithm configuration from the metadata management subsystem 104. After the pulled algorithm is parsed correctly, a current algorithm inside the distributed processing subsystem 106 may be replaced in real time.

Compared with a conventional solution, a cloud algorithm is fast in development, configuration, and deployment, and supports hot update of configurations, and therefore, has a better flexibility and extensibility than that in generating an alarm by a battery device itself, and makes it more convenient for unified management of alarms of different types.

In some embodiments of the present application, the distributed processing subsystem 106 includes a plurality of subnodes, and the battery signal data received in a same subqueue is preferentially parsed by a same subnode. Data from a same subqueue in an upstream message queue may all enter a same subnode of a processing system for parsing, and this is determined by a feature of a distributed message queue. A subqueue is bound to a subnode, and the subnode processes all data in the subqueue. The binding is changed only when the subnode is faulty. The feature ensures that each subnode in the processing system can process all signal data of a same battery, so that meaningless overheads caused by transmission of information about a single battery among different subnodes are avoided, so that the processing system can quickly make statistics and aggregate the information about the single battery.

In some embodiments of the present application, if the subnode is faulty, the distributed processing subsystem 106 notifies another available subnode and sends data already parsed before the fault to the another available subnode. Each subnode in the distributed processing subsystem 106 receives data from zero subqueues, one subqueue, or a plurality of subqueues in the upstream message queue. When one subnode is faulty, another subnode may automatically take over data from a subqueue that the faulty subnode is previously responsible for receiving. This ensures stability and reliability of processing data generated by an algorithm.

Fault recovery in the distributed processing subsystem 106 is ensured via a distributed queue system. Each subnode is connected to the distributed queue system, and obtains a data stream to be processed from the distributed queue system. When a distributed parsing node is faulty, the distributed queue system detects a fault, and notifies another available distributed parsing node to receive a data stream previously processed by the faulty node. This can avoid unnecessary repeated calculations.

In some embodiments of the present application, still referring to FIG. 1, the system 10 for vehicle battery management further includes a storage subsystem 108, and the storage subsystem 108 is configured to store the parsed data and the alarm data in a distributed manner. For example, the alarm data generated in the system 10 for vehicle battery management (which is specifically the distributed processing subsystem 106) is written to the storage subsystem 108 such as a key-value (KV) storage system in real time. Battery alarm data may be retrieved by using a battery ID. A battery signal in the KV storage system can be retrieved by an external analysis system. In some examples, Apache Cassandra may be used as the KV storage system. Compared with a conventional solution, the system 10 for vehicle battery management may store and query the alarm data in real time. The alarm data, after parsing, is used to name file paths according to a specific rule. This can well organize data of a plurality of batteries and in a plurality of time periods, to facilitate subsequent review by engineers.

In some examples, a retrieval and query system may support query of battery alarms with the following features: searching based on a specified battery serial number; retrieval based on a specified time range; retrieval based on a specified alarm name; restricting a maximum number of returned data items in a single query; and displaying a battery signal associated with battery alarms in a retrieval result. In addition, the retrieval system may further support query of the parsed data.

In some embodiments of the present application, the system further includes an output subsystem (not shown in the figure), and the output subsystem is configured to output the alarm data in a distributed message queue. The alarm data generated in the system 10 for vehicle battery management (which is specifically the distributed processing subsystem 106) may be additionally written to another distributed message queue. For example, data in the message queue of the output subsystem may be obtained by other third-party downstream external systems. For example, the systems may be warning systems, where the warning systems may extract alarm signals in the message queue and determine whether to send the signals to a related person. In the solution, recent data of one battery can be aggregated in real time, to implement specific work of generating an alarm in the cloud and notify the downstream (display or notify a related downstream person) in real time.

In some examples, the data in the message queue of the output subsystem may be received by a periodic persistence service, to regularly store incremental data in a distributed object storage system. In some examples, the periodic persistence service may be implemented by using Apache Spark. For example, the incremental data is persisted to the distributed object storage system every five minutes. The distributed object storage system may be implemented by using, for example, an Amazon S3 storage system. Therefore, compared with a conventional solution, the system 10 for vehicle battery management may store a massive amount of alarm data over a long period of time, thereby facilitating auditing.

In some examples, persisted battery alarm data may be added with extra meta information, to be used as an input layer of a data warehouse. The metadata may include a database name, a table name, partition information (in days or hours), a data persistence storage path, etc.

Figure 3:
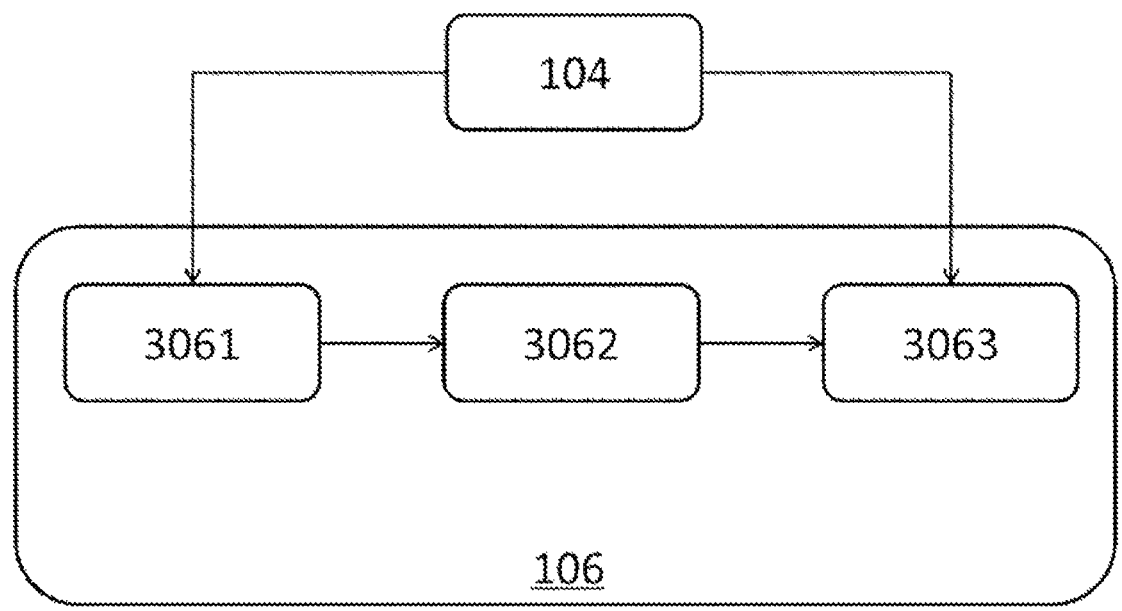
FIG. 3 shows a system for vehicle battery management according to an embodiment of the present application.

In some embodiments of the present application, referring to FIG. 3, the distributed processing subsystem 106 (specifically, a single node of the distributed processing subsystem) may include a parsing module 3061, a buffer module 3062, and an alarm module 3063. The parsing module 3061 is configured to parse the battery signal data based on the pulled battery information, to obtain parsed data. The parsing module 3061 processes various types of original data (for example, original binary data received from an external message queue). If the data is in a compressed format, the parsing module 3061 may first decompress the data based on a type of compression. For example, the parsing module 3061 may support a JavaScript object notation (JSON) parser, a Google protobuf parser, a controller area network (CAN) parser, etc.

The buffer module 3062 is configured to buffer a predetermined amount of latest parsed data. The buffer module 3062 may be configured to preserve and buffer parsed battery data received most recently (such as data within five minutes). In some examples, specific configuration may be in the following manners: M data pools may be maintained in a memory, and each data pool corresponds to one buffer queue and one independent reading and writing thread. There is no data exchange between the data pools. The parsed data of a battery signal may be grouped into a data pool, where ID of the data pool=Hash (battery ID) % M. parsed data in each data pool may be organized by using, for example, a HashMap <String, LinkedList<BatteryData>>, where a key of the HashMap is based on the battery ID, and a value thereof is a doubly linked list formed by one group of parsed data. BatteryData represents a set of all types of parsed data of one battery at a sampling moment. Elements in a linked list of parsed data are sorted by a time at which data can arrive. For example, an element at the end of the linked list is the newest, and an element at the head of the linked list is the oldest. The maximum number of elements maintained in the linked list is configurable. Whenever a piece of battery data enters at the end of the list, the oldest data is eliminated from the head of the list based on requirements.

The data in the buffer module 3062 includes all fields, and may be read-only for a downstream module, or may be reused a plurality of times, so that the alarm module 3063 can relatively conveniently extend its alarm algorithm.

The alarm module 3063 is configured to obtain the alarm data based on the pulled battery information and the predetermined amount of parsed data. The alarm module 3063 uses the data in the buffer module 3062 for analysis, to generate cloud alarm data that meets conditions. In some embodiments of the present application, the metadata management subsystem 104 further stores an alarm algorithm, and the alarm module 3063 is configured to obtain alarm data by parsing latest parsed data of one battery based on the alarm algorithm. In some examples, the alarm module 3063 supports a single-point cloud alarm algorithm. Single-point alarming means that a group of signal values at the newest sampling point of one battery are input, and if a combination of various signal values meets a triggering condition for a type of alarms, an alarm signal (included in the alarm data, which is the same below) is generated. A type of parsed data required for generating the alarm signal depends on a specific definition of the algorithm.

In some embodiments of the present application, if the number of outliers in the parsed data within a time period exceeds a predetermined value, an alarm signal is generated.

In some examples, the alarm module 3063 supports a window cloud alarm algorithm. Window alarming means that data at a plurality of sampling points of one battery within the most recent period of time is input (where a group of signal values are included at each sampling point, and the various sampling points are sorted by a data sampling time), to detect each sampling point for an anomalous point. If an enough number of sampling points are determined as anomalous points within a time window, an alarm signal is generated. A type of a battery signal required for generating an alarm depends on a specific definition of the algorithm. It should be noted that, it can be ensured based on the configurations above that, the buffer module 3062 can obtain a group of signals sorted in chronological order of a same battery.

In addition, to optimize computing performance of the window cloud alarm algorithm, incremental processing may be used in some examples of the present application. For a same battery, it is assumed that sampling points are reached in chronological order. All sampling points (where normal points and anomalous points are all stored) in a current window of the battery and the number c of anomalous points at the current window are maintained. As the window moves ahead, a new sampling point is first determined, and if it is determined as an anomalous point, c=c+1. Then, the oldest sampling point out of the window is determined, and if it is an anomalous point, c=c−1 (where if there are a plurality of old sampling points are to be eliminated, calculation are performed a plurality of times). At last, a value of c and a threshold for triggering an alarm in the moved window and t are compared, and if c>=t, an alarm signal is generated.

In some examples of the invention, the distributed processing subsystem 106 may periodically (for example, every 1 minute) read all configuration parameters of a cloud alarm algorithm, parse all the configurations, and dynamically adjust implementation of an algorithm inside the system based on requirements if all the configurations are parsed correctly, to match new parameters. If no change is found in the configurations, the algorithm inside is not adjusted. In addition, dynamic addition, modification, and deletion of the cloud alarm algorithm may be supported. In some examples, the following may be configured: (1) an algorithm type, for example, a single-point alarm algorithm, a window alarm algorithm, etc. (2) a parameter for a condition of a single anomalous sampling point. A JSON format may be used for configuration and storage. Input of a plurality of types of data of a vehicle and a battery signal may be further supported. For example: a total voltage of a battery pack, a maximum cell voltage, a minimum cell voltage, an average cell voltage, an average current, an insulation resistance, a state of charge (SOC), a traveling status of a vehicle, a charging status, battery remaining energy, a maximum cell temperature, a minimum cell temperature, an average temperature, and a battery type. A plurality of types of operations and logical operators may be supported. For example: addition, subtraction, multiplication, division, IfNull, IfNotNull, string prefix matching, and string suffix matching; greater than, less than, equal to, not equal to, greater than or equal to, and less than or equal to; and logical AND, logical NOT, and logic OR. A multi-level condition nesting is supported. For example: (a>3) && <2||c=1), where a, b, and c are three different pieces of signal data. (3) further, a window duration parameter and a parameter indicating a minimum number of anomalous points in a window for the window alarm algorithm.

The distributed processing subsystem 106 may further include a storage asynchronous sending module (not shown in the figure), where the storage asynchronous sending module maintains an internal queue, receives battery parsing/alarm data from various sub-modules, and periodically (about every 100 ms) sends the data to the storage subsystem 108 such as an external KV storage system. In addition, a sending period and the number of internal threads may be configured. A larger number of threads allows a higher speed of sending.

The distributed processing subsystem 106 may further include a message-queue asynchronous sending module (not shown in the figure), where the message-queue asynchronous sending module maintains an internal queue, receives battery parsing/alarm data from various sub-modules, and periodically (about every 100 ms) sends the data to an external (output subsystem) message queue system. In addition, a sending period and the number of internal threads may be configured. A larger number of threads allows a higher speed of sending.

The distributed processing subsystem 106 may further include a static configuration module (not shown in the figure) configured to manage static configuration parameters of various modules.

The distributed processing subsystem 106 may further include a monitoring module (not shown in the figure), where the monitoring module monitors statuses of other various modules in the distributed processing subsystem 106, and periodically reports a monitoring result to an external monitoring system. Each module includes at least the following monitoring items: an amount of signal data processed by each module per second/minute; an average time (a unit of which is generally ms) required for processing of each module or in a processing step per second/minute; the number of times data is successfully/fails to be processed by each module or in a processing step per second/minute; and the number of times of generating various alarms per second/minute.

Figure 2:
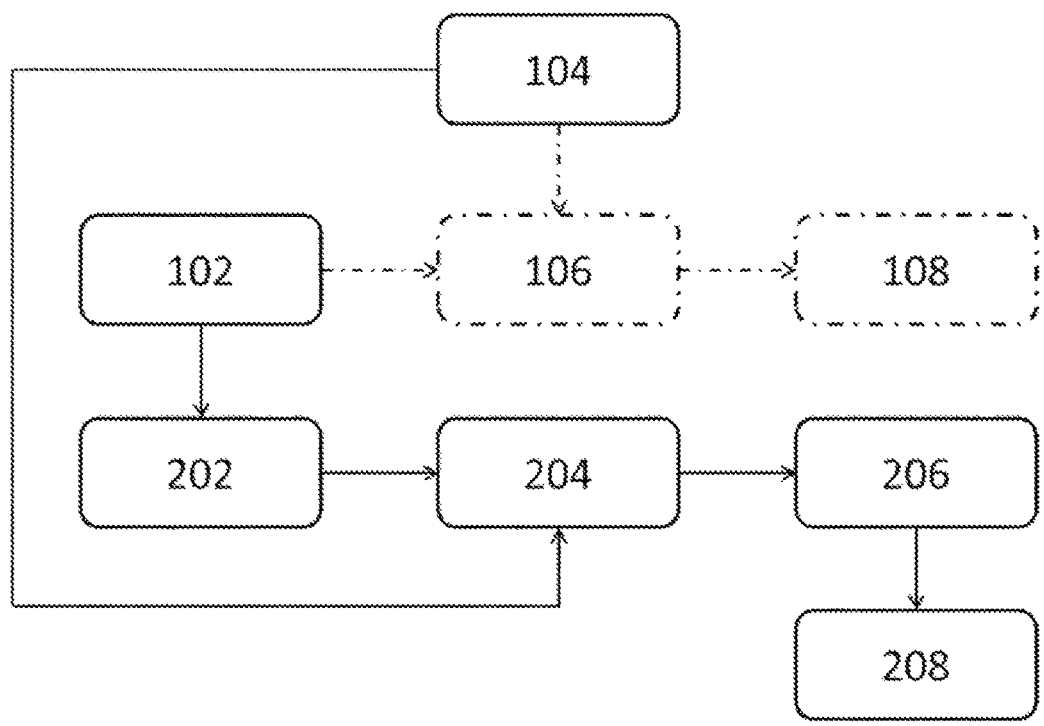
FIG. 2 shows a system for vehicle battery management according to an embodiment of the present application.

In some embodiments of the present application, as shown in FIG. 2, a system 20 for vehicle battery management further includes a data warehouse 202, a distributed data processing and scheduling module 204, an online storage subsystem 206, and an interface module 208. The data warehouse 202 is configured to receive and store the battery signal data from the communications subsystem 102. The off-line data warehouse 202 may include a massive amount of historically reported data of a vehicle, which usually may include battery signal data in the following forms (and any battery signal data described above may be supplemented accordingly): signal data of a battery itself (for example, a sampling moment, a moment for reporting to a server, a vehicle ID, a (maximum, minimum, and average) battery cell voltage, a (maximum, minimum, and average) battery cell temperature, a battery pack voltage, a battery insulation resistance, a battery state of charge (SOC), battery remaining energy (in units of kilowatt hour), another battery signal, a vehicle traveling status, a vehicle charging status, a vehicle traveling speed, and a longitude and a latitude of a position of the vehicle); and vehicle battery static data (for example, a battery ID, a battery software version, a vehicle ID, versions of various modules on the vehicle, and a vehicle type). Data in the data warehouse 202 can usually be preserved for over one year. In some examples, the data in the data warehouse 202 may be stored in a distributed file system which is Hadoop distributed file system (HDFS).

The distributed data processing and scheduling module 204 is configured to read the battery signal data in the data warehouse 202 and generate warning data and statistical data based on the battery information. The distributed data processing and scheduling module 204 is not intended to generate the warning data and the statistical data in real time, but to generate the warning data and the statistical data based on historical information within a period of time.

The distributed data processing and scheduling module 204 may read the battery signal data in the data warehouse 202, perform calculations based on a specified warning algorithm, and output warning data and other battery statistical analysis data that meet requirements and store them in the online storage subsystem 206, where all types of warning data can be stored in a unified format. Because there are a huge amount of battery data to be processed, and a plurality of machines are required to perform parallel data processing to give an alarm in time, a distributed data processing system is used.

There may be a plurality of warning algorithms in the distributed data processing and scheduling module 204, and the algorithms may have different generation periods (in hours/days/weeks). The distributed data processing and scheduling module 204 can ensure that different warning data is periodically generated according to their own periods. Integrity of upstream dependent signal data is automatically checked (to prevent inaccurate warning generation due to automatic running of a warning algorithm when some data sources are lost). Resources (which are a CPU, a memory, a network, and a hard disk) required for computing are properly allocated, and a failed warning calculation task is retried. Compared with a conventional solution, the warning data generated by the distributed data processing and scheduling module 204 based on big data and a distributed solution is used, so that a battery with a potential problem can be known relatively earlier, a supervisor can be notified earlier, and the problematic battery can be recalled earlier, thereby protecting safety of vehicle owners and security of their properties. Development, testing, deployment, and configuration of the warning algorithm are flexible, and the warning algorithm has an iteration cycle much shorter than a corresponding period of vehicle battery alarming. In addition, a warning is generated by analyzing historical battery data within a longer period of time, which can find a problem that cannot be found by using alarms generated on a battery device.

In some examples of the invention, Apache Spark may be used for distributed data processing, Apache Hadoop YARN may be used for scheduling of computing resources, and Apache Oozie may be used for scheduling of algorithm tasks. A frequency of generating a warning is in hours, days, or weeks.

The online storage subsystem 206 is configured to store the warning data and the statistical data. The warning data and the other battery analysis data that are generated by the distributed data processing and scheduling module 204 are stored in the online storage subsystem 206. In some examples, various types of warning data and statistical data are stored in the following formats: warning data (where for example, a battery ID, a warning algorithm name, an algorithm version number, a warning generation moment, a list of warning parameter names, and a list of warning values may be included); battery statistical information (where for example, a battery ID, a mileage (within one day or historically accumulated), a power consumption (within one day or historically accumulated), a charging capacity (within one day or historically accumulated), the number of times of charging (within one day or historically accumulated), and a time used for charging (within one day or historically accumulated) may be included); battery version change information (where for example, a battery ID, a battery software/hardware version number, a time at which a current version number comes into effect, and a time at which an original version number ceases to be effective may be included); battery carrier information (where for example, a battery ID, a carrier (a vehicle/battery swap station/battery energy storage station) of a battery, a time at which a current version number comes into effect, and a time at which an original version number ceases to be effective may be included); and actual alarm data of a battery device itself (where for example, a battery ID, a vehicle ID, an alarm generation moment, an alarm signal name, a longitude and a latitude of a vehicle when an alarm is given, and a carrier (a vehicle/battery swap station/battery energy storage station) of a battery when the alarm is given may be included).

In some examples of the invention, the online storage subsystem 206 may be managed by using MySQL.

The interface module 208 is configured to invoke the data in the online storage subsystem 206. For example, the interface module 208 may be used for querying the warning data. After a user inputs search conditions such as a battery ID, a warning algorithm name, a sorting rule, a query time period, etc., the interface module 208 may return a list of battery warning data that meets requirements. The warning algorithm may include: an insulation monitoring algorithm, an insulation deterioration monitoring algorithm, a module voltage dropout algorithm, a voltage dropout warning-charging cell voltage outlier algorithm, a cell internal resistance increase monitoring algorithm, and a negative temperature coefficient (NTC) temperature sensor troubleshooting algorithm.

The interface module 208 may be configured to query battery status statistics. When a user receives a warning, the user may input a battery ID, a query time period, etc., and the interface module 208 may return various statistical information of a battery, including cumulative statistical information of the battery, daily statistical information of the battery, battery version change information, battery device change information, battery warning information, etc.

The interface module 208 may be used for interaction in managing battery problems. A supervisor may pay attention to warning information of a specific battery or a specific type of warning, and records a process of tracking the specific problem, to help following auditing and reviewing. The interaction is preformed via the interface module 208. The management of battery problems may include the following information: an ID of a problematic battery, a problem name, a problem type, a time at which a problem occurs, a problem tracking status (whether tracking is finally completed), and a person responsible for tracking a problem. In addition, a user may add, delete, modify, and query information about the management of battery problems.

In some examples, data that can be invoked by the interface module 208 may further be sent to a specific object by using a warning email. For example, a receiver staff or group for each type of warning is configured, so that a related supervisor may regularly receive an email about a latest battery warning. In some examples, configurations may be implemented inside the system via the interface module 208. For example, management of warning configurations, which may specifically include detailed descriptions of a warning, a displayed name of the warning, whether email notification is needed, and sending to an email group, may be implemented via the interface module 208. In addition, information about a user who receives an email, which may specifically include a name, an email, and a department that are of the user, and an email group including the user, may be configured via the interface module 208. In addition, a front-end display module (not shown in the figure) may receive a user input and invoke the interface module 208, and display a returned result in a browser.

Those skilled in the art should understand that the foregoing various components of the distributed system are all distributed and extensible, that is, all can achieve approximately linear improvement of processing capabilities by increasing machines.

Figure 4:
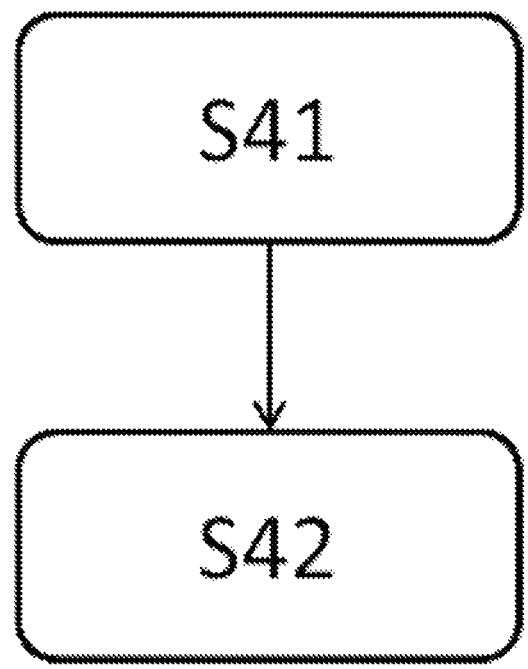
FIG. 4 shows a method for vehicle battery management according to an embodiment of the present application.

According to another aspect of the present application, a method for vehicle battery management is provided. As shown in FIG. 4, the method for vehicle battery management includes: Battery signal data is received in a distributed message queue in step S41, and in step S42, the battery signal data is parsed based on battery information to obtain parsed data and alarm data. In the following examples, specific entities perform some steps of the method, but those skilled in the art should understand that the introduction of the entities are used merely to facilitate in describing the principle of the method, and execution of the method may not be dependent on specific entities.

In the method for vehicle battery management, the battery signal data is received in the distributed message queue in step S41. Compared with a conventional manner of data sending and receiving, in the distributed message queue, a large amount of data can be received or sent in real time. Original battery signal data (or referred to as upstream data) from a vehicle/charging facility enters the distributed message processing queue via an external system, and therefore, a system for vehicle battery management collects the upstream data. In some examples, Apache Kafka may be used as a distributed message queue.

In some embodiments of the present application, the battery signal data not only represents data of a battery itself, but may also be data of a vehicle, a charging device, etc. associated with the battery. The battery signal data may include a data collection moment, a voltage of a battery pack, a maximum cell voltage, a minimum cell voltage, an average cell voltage, an average current, a battery insulation resistance, a state of charge, a status of a vehicle (including a traveling state and a charging state) to which a battery belongs, battery remaining energy, a maximum cell temperature, a minimum cell temperature, an average cell temperature, a battery type, and a battery serial number.

In some embodiments of the present application, the distributed message queue includes a plurality of subqueues, and the communications subsystem receives battery signal data from a same battery in a same subqueue. In this way, it can be ensured that in normal cases, a same node processes data from a same battery, thereby avoiding extra and meaningless resource overheads inside the system for vehicle battery management.

For example, a metadata management subsystem may be configured to store battery information. The metadata management subsystem stores basic information about various types of batteries (also referred to as metadata of the batteries). In view of differences between the batteries, processes of parsing for the batteries are not exactly the same, so that parsing needs to be performed based on the basic information about the batteries.

In some embodiments of the present application, the battery information (battery metadata) not only represents metadata (basic parameters) of a battery itself, but may also be metadata (basic parameters) of a vehicle, a charging device, etc. associated with the battery. The battery information may include information about a battery serial number, serial number information of a vehicle to which a battery belongs, a position of the vehicle to which the battery belongs, serial number information of a battery charging device, a name of battery signal data, a format of the battery signal data, and a source of the battery signal data. In the present application, unless special cases other than the following definitions are listed, the battery information is generally determined after factory delivery, and the battery signal data is generally generated and changes based on actual usage.

In the method for vehicle battery management, the battery signal data is parsed based on the battery information, to obtain the parsed data and the alarm data in step S42. The parsed data may be used for retrieval and analysis. The alarm data may not only be used for retrieval and analysis, but may also be used to be sent to a related downstream person/device, etc. In some embodiments of the present application, the metadata management subsystem may further store an alarm algorithm, and for example, the distributed processing subsystem may parse the battery signal data based on the alarm algorithm, to obtain the parsed data and the alarm data. The distributed processing subsystem may periodically (for example, every 1 minute) pull a latest cloud alarm algorithm configuration from the metadata management subsystem. After the pulled algorithm is parsed correctly, a current algorithm inside the distributed processing subsystem may be replaced in real time.

In some embodiments of the present application, the distributed processing subsystem uses a plurality of subnodes to process the battery signal data, and the battery signal data received in a same subqueue is preferentially parsed by a same subnode. Data from a same subqueue in an upstream message queue may all enter a same subnode of a processing system for parsing, and this is determined by a feature of a distributed message queue.

In some embodiments of the present application, if the subnode is faulty, the distributed processing subsystem notifies another available subnode and sends data already parsed before the fault to the another available subnode. Each subnode in the distributed processing subsystem receives data from zero subqueues, one subqueue, or a plurality of subqueues in the upstream message queue. When one subnode is faulty, another subnode may automatically take over data from a subqueue that the faulty subnode is previously responsible for receiving. This ensures stability and reliability of processing data generated by an algorithm.

In some embodiments of the present application, the method further includes: storing the parsed data and the alarm data in a distributed manner. In addition, in some embodiments of the present application, the method further includes: outputting the alarm data in a distributed message queue.

In some embodiments of the present application, the method further includes: parsing the battery signal data based on the pulled battery information, to obtain the parsed data; buffering a predetermined amount of latest parsed data; and obtaining the alarm data based on the pulled battery information and the predetermined amount of parsed data. If the data is in a compressed format, the parsing module, for example, may first decompress the data based on a type of compression. For example, the parsing module may support a JavaScript object notation (JSON) parser, a Google protobuf parser, a controller area network (CAN) parser, etc. The buffer module, for example, may be configured to preserve and buffer parsed battery data received most recently (such as data within five minutes). In some examples, specific configuration may be in the following manners: M data pools may be maintained in a memory, and each data pool corresponds to one buffer queue and one independent reading and writing thread. There is no data exchange between the data pools. The parsed data of a battery signal may be grouped into a data pool, where ID of the data pool=Hash (battery ID) % M. parsed data in each data pool may be organized by using, for example, a HashMap <String, LinkedList<BatteryData>>, where a key of the HashMap is based on the battery ID, and a value thereof is a doubly linked list formed by one group of parsed data. BatteryData represents a set of all types of parsed data of one battery at a sampling moment.

The alarm module, for example, uses the data in the buffer module for analysis, to generate cloud alarm data that meets conditions. In some embodiments of the present application, the metadata management subsystem further stores an alarm algorithm, and the alarm module may obtain alarm data by parsing latest parsed data of one battery based on the alarm algorithm. In some examples, the alarm module supports a single-point cloud alarm algorithm. Single-point alarming means that a group of signal values at the newest sampling point of one battery are input, and if a combination of various signal values meets a triggering condition for a type of alarms, an alarm signal (included in the alarm data, which is the same below) is generated. A type of parsed data required for generating the alarm signal depends on a specific definition of the algorithm.

In some embodiments of the present application, if the number of outliers in the parsed data within a time period exceeds a predetermined value, an alarm signal is generated. In some examples, the alarm module supports a window cloud alarm algorithm. Window alarming means that data at a plurality of sampling points of one battery within the most recent period of time is input (where a group of signal values are included at each sampling point, and the various sampling points are sorted by a data sampling time), to detect each sampling point for an anomalous point. If an enough number of sampling points are determined as anomalous points within a time window, an alarm signal is generated. A type of a battery signal required for generating an alarm depends on a specific definition of the algorithm. It should be noted that, it can be ensured based on the configurations above that, the buffer module can obtain a group of signals sorted in chronological order of a same battery.

In addition, to optimize computing performance of the window cloud alarm algorithm, incremental processing may be used in some examples of the present application. For a same battery, it is assumed that sampling points are reached in chronological order. All sampling points (where normal points and anomalous points are all stored) in a current window of the battery and the number c of anomalous points at the current window are maintained. As the window moves ahead, a new sampling point is first determined, and if it is determined as an anomalous point, $c=c+1$. Then, the oldest sampling point out of the window is determined, and if it is an anomalous point, $c=c-1$ (where if there are a plurality of old sampling points are to be eliminated, calculation are performed a plurality of times). At last, a value of c and a threshold for triggering an alarm in the moved window and t are compared, and if $c>=t$, an alarm signal is generated.

In some examples of the invention, the distributed processing subsystem may periodically (for example, every 1 minute) read all configuration parameters of a cloud alarm algorithm, parse all the configurations, and dynamically adjust implementation of an algorithm inside the system based on requirements if all the configurations are parsed correctly, to match new parameters. If no change is found in the configurations, the algorithm inside is not adjusted. In addition, dynamic addition, modification, and deletion of the cloud alarm algorithm may be supported. In some examples, the following may be configured: (1) an algorithm type, for example, a single-point alarm algorithm, a window alarm algorithm, etc. (2) a parameter for a condition of a single anomalous sampling point. A JSON format may be used for configuration and storage. Input of a plurality of types of data of a vehicle and a battery signal may be further supported. For example: a total voltage of a battery pack, a maximum cell voltage, a minimum cell voltage, an average cell voltage, an average current, an insulation resistance, a state of charge (SOC), a traveling status of a vehicle, a charging status, battery remaining energy, a maximum cell temperature, a minimum cell temperature, an average temperature, and a battery type. A plurality of types of operations and logical operators may be supported. For example: addition, subtraction, multiplication, division, IfNull, IfNotNull, string prefix matching, and string suffix matching; greater than, less than, equal to, not equal to, greater than or equal to, and less than or equal to; and logical AND, logical NOT, and logic OR. A multi-level condition nesting is supported. For example: (a>3) && <2||c=1), where a, b, and c are three different pieces of signal data. (3) further, a window duration parameter and a parameter indicating a minimum number of anomalous points in a window for the window alarm algorithm.

In some embodiments of the present application, the method further includes: sending battery parsing/alarm data to a storage system in an asynchronous sending manner, for example, periodically sending the data to an external KV storage system. In addition, a sending period and the number of internal threads may be configured. A larger number of threads allows a higher speed of sending.

In some embodiments of the present application, the method further includes: sending battery parsing/alarm data to an external message queue system in an asynchronous sending manner, for example, periodically (about every 100 ms) sending the data to the external (output subsystem) message queue system. In addition, a sending period and the number of internal threads may be configured. A larger number of threads allows a higher speed of sending.

In some embodiments of the present application, the method further includes: managing static configuration parameters of the various modules.

In some embodiments of the present application, the method further includes: monitoring statuses of other various modules in the distributed processing subsystem, and periodically reports a monitoring result to an external monitoring system. Each module includes at least the following monitoring items: an amount of signal data processed by each module per second/minute; an average time (a unit of which is generally ms) required for processing of each module or in a processing step per second/minute; the number of times data is successfully/fails to be processed by each module or in a processing step per second/minute; and the number of times of generating various alarms per second/minute.

Figure 5:
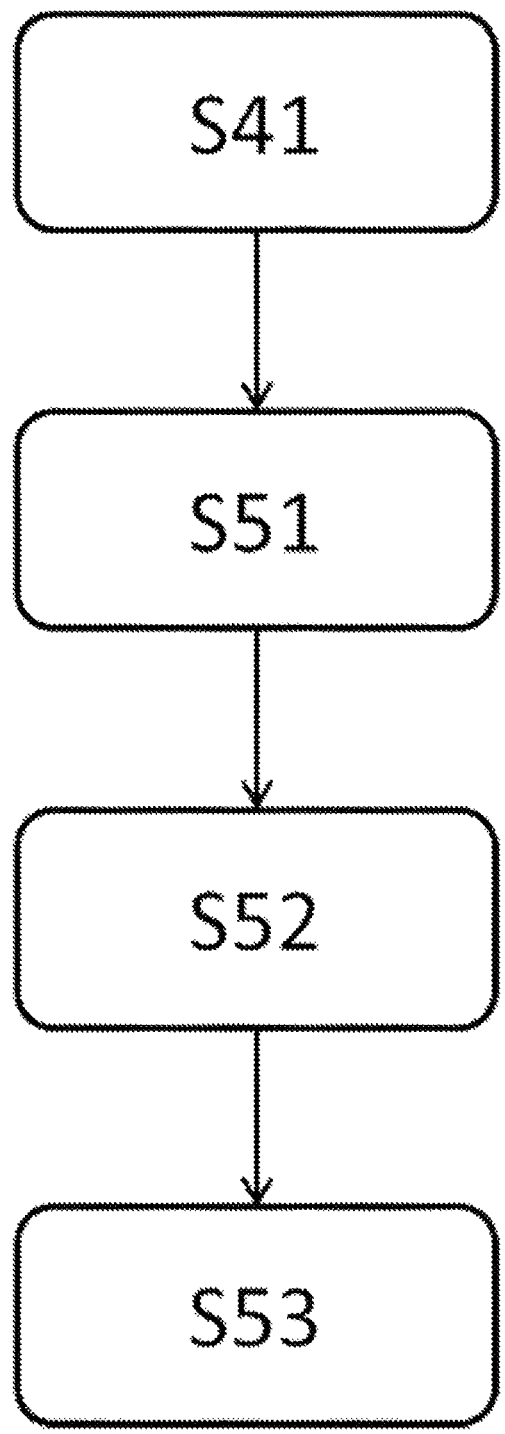
FIG. 5 shows a method for vehicle battery management according to an embodiment of the present application.

In some embodiments of the present application, referring to FIG. 5, a method for vehicle battery management includes: battery signal data is stored in step S51, warning data and statistical data are generated based on battery information and the stored battery signal data in step S52, and the warning data and the statistical data are stored for invocation in step S53.

In the method for vehicle battery management, the battery signal data is stored in step S51. A data warehouse, for example, may receive and store the battery signal data from a communications subsystem. The off-line data warehouse may include a massive amount of historically reported data of a vehicle, which usually may include battery signal data in the following forms (and any battery signal data described above may be supplemented accordingly): signal data of a battery itself (for example, a sampling moment, a moment for reporting to a server, a vehicle ID, a (maximum, minimum, and average) battery cell voltage, a (maximum, minimum, and average) battery cell temperature, a battery pack voltage, a battery insulation resistance, a battery state of charge (SOC), battery remaining energy (in units of kilowatt hour), another battery signal, a vehicle traveling status, a vehicle charging status, a vehicle traveling speed, and a longitude and a latitude of a position of the vehicle); and vehicle battery static data (for example, a battery ID, a battery software version, a vehicle ID, versions of various modules on the vehicle, and a vehicle type). Data in the data warehouse can usually be preserved for over one year. In some examples, the data in the data warehouse may be stored in a distributed file system which is Hadoop distributed file system (HDFS).

In the method for vehicle battery management, the warning data and the statistical data are generated based on the battery information and the stored battery signal data in step S52. This step is not intended to generate the warning data and the statistical data in real time, but to generate the warning data and the statistical data based on historical information within a period of time.

The distributed data processing and scheduling module, for example, may read the battery signal data in the data warehouse, perform calculations based on a specified warning algorithm, and output warning data and other battery statistical analysis data that meet requirements and store them in, for example, the online storage subsystem, where all types of warning data can be stored in a unified format. Because there are a huge amount of battery data to be processed, and a plurality of machines are required to perform parallel data processing to give an alarm in time, a distributed data processing system is used.

There may be a plurality of warning algorithms in the distributed data processing and scheduling module, and the algorithms may have different generation periods (in hours/days/weeks). The distributed data processing and scheduling module can ensure that different warning data is periodically generated according to their own periods. Integrity of upstream dependent signal data is automatically checked (to prevent inaccurate warning generation due to automatic running of a warning algorithm when some data sources are lost). Resources (which are a CPU, a memory, a network, and a hard disk) required for computing are properly allocated, and a failed warning calculation task is retried.

In some examples of the invention, Apache Spark may be used for distributed data processing, Apache Hadoop YARN may be used for scheduling of computing resources, and Apache Oozie may be used for scheduling of algorithm tasks. A frequency of generating a warning is in hours, days, or weeks.

In the method for vehicle battery management, the warning data and the statistical data are stored for invocation in step S53. The warning data and the other battery analysis data that are generated by the distributed data processing and scheduling module are stored in the online storage subsystem. In some examples, various types of warning data and statistical data are stored in the following formats: warning data (where for example, a battery ID, a warning algorithm name, an algorithm version number, a warning generation moment, a list of warning parameter names, and a list of warning values may be included); battery statistical information (where for example, a battery ID, a mileage (within one day or historically accumulated), a power consumption (within one day or historically accumulated), a charging capacity (within one day or historically accumulated), the number of times of charging (within one day or historically accumulated), and a time used for charging (within one day or historically accumulated) may be included); battery version change information (where for example, a battery ID, a battery software/hardware version number, a time at which a current version number comes into effect, and a time at which an original version number ceases to be effective may be included); battery carrier information (where for example, a battery ID, a carrier (a vehicle/battery swap station/battery energy storage station) of a battery, a time at which a current version number comes into effect, and a time at which an original version number ceases to be effective may be included); and actual alarm data of a battery device itself (where for example, a battery ID, a vehicle ID, an alarm generation moment, an alarm signal name, a longitude and a latitude of a vehicle when an alarm is given, and a carrier (a vehicle/battery swap station/battery energy storage station) of a battery when the alarm is given may be included).

The data in the online storage subsystem may be invoked by, for example, the interface module. For example, the interface module may be used for querying the warning data. After a user inputs search conditions such as a battery ID, a warning algorithm name, a sorting rule, a query time period, etc., the interface module may return a list of battery warning data that meets requirements. The warning algorithm may include: an insulation monitoring algorithm, an insulation deterioration monitoring algorithm, a module voltage dropout algorithm, a voltage dropout warning-charging cell voltage outlier algorithm, a cell internal resistance increase monitoring algorithm, and a negative temperature coefficient (NTC) temperature sensor troubleshooting algorithm.

The interface module, for example, may be configured to query battery status statistics. When a user receives a warning, the user may input a battery ID, a query time period, etc., and the interface module may return various statistical information of a battery, including cumulative statistical information of the battery, daily statistical information of the battery, battery version change information, battery device change information, battery warning information, etc.

The interface module, for example, may be used for interaction in managing battery problems. A supervisor may pay attention to warning information of a specific battery or a specific type of warning, and records a process of tracking the specific problem, to help following auditing and reviewing. The interaction is preformed via the interface module. The management of battery problems may include the following information: an ID of a problematic battery, a problem name, a problem type, a time at which a problem occurs, a problem tracking status (whether tracking is finally completed), and a person responsible for tracking a problem. In addition, a user may add, delete, modify, and query information about the management of battery problems.

In some examples, data that can be invoked by the interface module may further be sent to a specific object by using a warning email. For example, a receiver staff or group for each type of warning is configured, so that a related supervisor may regularly receive an email about a latest battery warning. In some examples, configurations may be implemented inside the system via the interface module. For example, management of warning configurations, which may specifically include detailed descriptions of a warning, a displayed name of the warning, whether email notification is needed, and sending to an email group, may be implemented via the interface module. In addition, information about a user who receives an email, which may specifically include a name, an email, and a department that are of the user, and an email group including the user, may be configured via the interface module. In addition, a front-end display module may receive a user input and invoke the interface module, and display a returned result in a browser.

According to another aspect of the present application, a non-transitory computer-readable storage medium is provided, in which instructions are stored, and when the instructions are executed by a processor, the processor is enabled to perform any of the methods for vehicle battery management described above. The computer-readable medium referred to in the present application includes various types of non-transitory computer-readable media, and may be any available non-transitory medium that can be accessed by a general-purpose or dedicated computer. For example, the computer-readable medium may include a RAM, a ROM, an EPROM or $E^2$PROM, a register, a hard disk, a removable disk, a CD-ROM or another optical disc storage, a magnetic disk storage or another magnetic storage device, or any other non-temporary medium that can be used to carry or store an expected program code unit in a form of instructions or a data structure and that can be accessed by a general-purpose or dedicated computer or a general-purpose or dedicated processor. Data is usually copied magnetically in a disk used in this specification, while data is usually copied optically by using lasers in a disc. The combination thereof should also be included in the protection scope as the computer-readable medium. For example, the storage medium is coupled to the processor, to enable the processor to read and write information from/to the storage medium. In an alternative solution, the storage medium may be integrated with the processor. The processor and the storage medium may reside in an ASIC. The ASIC may reside in a user terminal. In an alternative solution, the processor and the storage medium may reside in the user terminal as discrete components.

According to another aspect of the present application, a server system is provided, including any of the computer-readable storage media described above.

In conclusion, the system and method for vehicle battery management, the storage medium, and the server system in the present application can implement centralized management of a battery, which cannot be implemented in a conventional solution. The foregoing descriptions are merely specific implementations of the present application, but the protection scope of the present application is not limited hereto. Those skilled in the art may conceive other feasible changes or replacements according to the technical scope disclosed in the present application, and these changes or replacements all fall within the protection scope of the present application. In a case of no conflict, the implementations of the present application and features in the implementations may further be combined with each other. The protection scope of the present application shall be subject to the descriptions of the claims.

What is claimed:

1. A system for vehicle battery management, wherein the system comprises:
   a communications subsystem configured to receive battery signal data in a distributed message queue, the battery signal data being generated based on actual usage of a battery;

a metadata management subsystem configured to store battery information, the battery information including information that is used to distinguish the battery from other batteries;

a distributed processing subsystem configured to parse the battery signal data based on the battery information, to obtain parsed data and alarm data, the alarm data including an alarm signal name of an alarm signal that indicates a potential problem with the battery;

a data warehouse configured to receive and store the battery signal data from the communications subsystem; and a distributed data processing and scheduling module configured to read the battery signal data in the data warehouse and generate warning data and statistical data based on the battery information.

2. The system according to claim 1, wherein the system further comprises a storage subsystem, and the storage subsystem is configured to store the parsed data and the alarm data in a distributed manner.

3. The system according to claim 1, wherein the battery signal data comprises at least one of the following: a data collection moment, a voltage of a battery pack, a maximum cell voltage, a minimum cell voltage, an average cell voltage, an average current, a battery insulation resistance, a state of charge, a status of a vehicle to which a battery belongs, battery remaining energy, a maximum cell temperature, a minimum cell temperature, an average cell temperature, a battery type, and a battery serial number.

4. The system according to claim 1, wherein the battery information comprises at least one of the following: information about a battery serial number, serial number information of a vehicle to which a battery belongs, a position of the vehicle to which the battery belongs, serial number information of a battery charging device, a name of battery signal data, a format of the battery signal data, and a source of the battery signal data.

5. The system according to claim 1, wherein the distributed message queue comprises subqueues, and the communications subsystem receives battery signal data from a same battery in a same subqueue.

6. The system according to claim 5, wherein the distributed processing subsystem comprises subnodes, and the battery signal data received in a same subqueue is parsed by a same subnode.

7. The system according to claim 6, wherein if the subnode is faulty, the distributed processing subsystem notifies another available subnode and sends data already parsed before the fault to the another available subnode.

8. The system according to claim 1, wherein the distributed processing subsystem comprises a parsing module, a buffer module, and an alarm module, wherein the parsing module is configured to parse the battery signal data to obtain the parsed data;

the buffer module is configured to buffer a predetermined amount of latest parsed data; and the alarm module is configured to obtain the alarm data based on the predetermined amount of parsed data.

9. The system according to claim 8, wherein the metadata management subsystem further stores an alarm algorithm, and the alarm module is configured to obtain the alarm data by parsing latest parsed data of one battery based on the alarm algorithm.

10. The system according to claim 8, wherein if the number of outliers in the parsed data within a time period exceeds a predetermined value, an alarm signal is generated.

11. The system according to claim 1, wherein the system further comprises an output subsystem, and the output subsystem is configured to output the alarm data in a distributed message queue.

12. The system according to claim 1, wherein the system further comprises:

an online storage subsystem configured to store the warning data and the statistical data; and an interface module configured to invoke data in the online storage subsystem.

13. A method for vehicle battery management, wherein the method comprises:

receiving battery signal data in a distributed message queue, the battery signal data being generated based on actual usage of a battery;

parsing the battery signal data based on battery information, to obtain parsed data and alarm data, the alarm data including an alarm signal name of an alarm signal that indicates a potential problem with the battery, the battery information including information that is used to distinguish the battery from other batteries;

storing the battery signal data;

generating warning data and statistical data based on the alarm data, the battery information, and the stored battery signal data; and rendering the warning data and the statistical data to a display.

14. The method according to claim 13, wherein the method further comprises:

storing the warning data and the statistical data.

15. A non-transitory computer-readable storage medium, wherein the non-transitory computer-readable storage medium stores instructions, wherein when the instructions are executed by a processor, the processor is enabled to perform the method according to claim 13.

16. A server system, wherein the server system comprises the non-transitory computer-readable storage medium according to claim 15.

* * * * *